July 8, 1952 — F. H. DAVIS — 2,602,395
RACK FOR HOLDING MASTER SHEETS
Filed Dec. 27, 1949
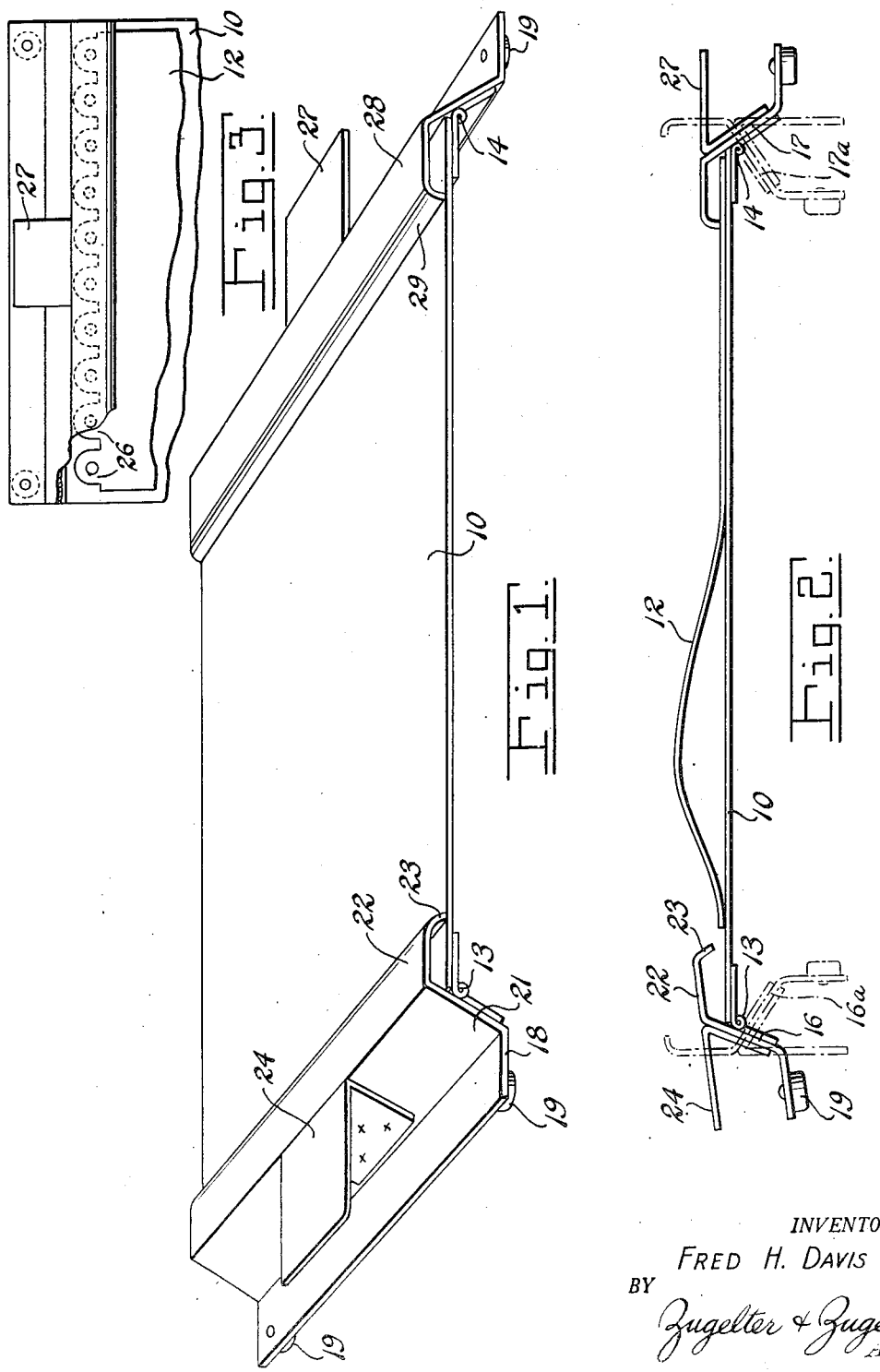
INVENTOR.
FRED H. DAVIS
BY Zugelter & Zugelter
Attys.

Patented July 8, 1952

2,602,395

UNITED STATES PATENT OFFICE 2,602,395

RACK FOR HOLDING MASTER SHEETS

Fred H. Davis, Hamilton, Ohio, assignor to Addressograph-Multigraph Corporation, Cleveland, Ohio, a corporation of Delaware Application December 27, 1949, Serial No. 135,288

5 Claims. (Cl. 101—131)

This invention relates to a rack for holding an offset master sheet or the like during treatment of the master sheet in cleaning, preserving, and developing the master sheet and in other treatment thereof.

In one type of offset printing, copy is set up on a flexible master sheet. The copy is inked and the ink is transferred to an offset roll which does the actual printing. Master sheets, which may be made of thin flexible sheet material such as zinc, aluminum, paper, or plastic, may be cleaned and reused. However, the cleaning process requires sponging of the copy surface with appropriate solvents, and during sponging the master sheet must be held firmly at both ends.

An object of this invention is to provide a rack constructed to hold an offset master sheet during sponging or other treatment.

A further object of this invention is to provide a rack having clamps adapted to engage both ends of a master sheet to hold the master sheet flat and smooth during treatment.

A further object of this invention is to provide a rack having clamping members which are so urged as to grip the ends of a master sheet as pressure is applied to the surface of the master sheet.

A further object of this invention is to provide a rack which grips a master sheet with greater firmness as the pressure applied to the master sheet is increased.

In the use of photo-sensitized masters, it is necessary to sponge a sensitized surface with appropriate photographic developers, and a further object of this invention is to provide a rack for holding a photo-sensitized master sheet during sponging.

The ends of master sheets, particularly paper master sheets, may be unnecessarily weakened if excessively wetted with cleaning or developing solutions, and a further object of this invention is to provide a rack having clamps which completely cover the ends of a master sheet to protect the ends thereof from cleaning and developing fluids.

The above and other objects and features of the invention will in part be obvious and will in part be apparent from the following detailed description, and the drawing, in which:

Figure 1 is a perspective view showing a rack constructed in accordance with an embodiment of this invention;

Fig. 2 is a view in side elevation showing the rack and a master sheet thereon; and Fig. 3 is a fragmentary plan view, partly broken away and in section, of an end of the rack and a master sheet thereon.

In the following detailed description and the drawing, like reference characters indicate like parts.

As shown in Figs. 1 and 2, the rack includes a flat, rectangular main panel 10 which is just a little larger than a master sheet 12 which may be held on the rack. The main panel 10 is provided at its ends with transverse hinges 13 and 14 to which are hinged Z-shaped clamping and support members 16 and 17. Only the clamping and support member 16 will be described as the clamping and support members 16 and 17 are generally similar in construction.

The clamping and support member 16 is generally of Z-shape and includes a lower arm 18 to which are attached rubber support pads 19 which carry the weight of the rack and resist downward pressure on the main panel 10. A central portion 21 of the member 16 is attached to the hinge. An upper arm 22 of the member 16 overhangs the ends of the main panel to which the member is hinged and a lip 23 is adapted to engage and hold the end of the master sheet. As shown in Fig. 2, the clamping and support member 16 may swing to raise the lip 23 from the panel 10 for inserting an end of the master sheet 12. A handle 24 attached to the central portion of the clamping and support member 16 may be used for swinging the member 16 between engaged and disengaged position.

As shown in Fig. 1 the upper arm 22 and the lip 23 are coextensive with the width of the main panel 10 so that, when the member 16 is in engaged position, the arm 22 and the lip 23 form protective covers for the end of the master sheet. As shown in Fig. 3, the ends of the master sheet are provided with hook members 26, and the clamp member protects these hook members during treatment of the master sheet preventing wetting thereof while the body of the master sheet is being sponged.

When the rack is to be used, the handle 24 and a similar handle 27 attached to the clamping and support member 17 may be gripped and the clamping and support members are turned back away from the main panel 10 to the position shown in dot-dash lines at 16a—17a in Fig. 2 at which the entire surface of the main panel 10 is exposed. Then the master sheet 12 is placed on the panel 10 and the clamping and support members are swung inwardly to the position shown in Fig. 1 to grip the opposite ends of the master sheet and hold the master sheet flat on top of the panel 10. When the master sheet is so disposed, it may be sponged for cleaning or other treatment, and the greater the pressure exerted upon the top of the master sheet, the greater is the clamping pressure applied to the ends of the master sheet. The upper arm 22 and lip 23 of the clamping and support member 16 and a corresponding upper arm 28 and lip 29 of the member 17 form protective covers for the ends of the master sheet preventing wetting thereof.

The rack may be readily constructed of sheet metal parts and the like. The clamping and support members 16 and 17 are preferably formed of metal having sufficient resiliency or spring to cause the clamping and support members to resiliently grip the ends of the master sheet when pressure is applied on panel 10.

The embodiment of the invention described above and illustrated in the drawing is subject to structural modification without departing from the spirit and scope of the appended claims.

Having described my invention what I claim as new and desire to secure by Letters Patent is:

1. A rack for holding an offset master sheet during treatment which comprises a flat, substantially rectangular panel adapted to support the master sheet, a pair of Z-shaped clamping and support members hinged on opposite ends of the rectangular panel, each of said clamping and support members including a lower arm extending away from the panel below the panel for supporting the panel, a central portion to which the hinge is attached, an upper clamping arm adapted to overlie the end of the panel to which the clamping and support member is hinged, and a lip on the inner edge of the upper arm, the lower arm lying to that side of the hinge remote from the upper arm, the lips of said clamping and support members being adapted to engage and grip the ends of the master sheet and thereby hold the master sheet on the panel when the lower arms of the clamping and support members support the rack, whereby when pressure is applied on the upper side of the master sheet, the clamping and support members grip the master sheet.

2. The rack in accordance with claim 1 characterized by the fact that the lip of each clamping and support member is substantially coextensive with the width of the panel to grip an end of the master sheet.

3. A rack for holding an offset master sheet during treatment which comprises a flat, substantially rectangular panel adapted to support the master sheet, a pair of Z-shaped clamping and support members hinged on opposite ends of the rectangular panel, each of said clamping and support members including a lower arm extending away from the panel below the panel for supporting the panel, a central portion to which the hinge is attached, an upper clamping arm adapted to overlie the end of the panel to which the clamping and support member is hinged, and a lip on the inner edge of the upper arm, the lower arm lying to that side of the hinge remote from the upper arm, the lips of said clamping and support members being adapted to engage and grip the ends of the master sheet and thereby hold the master sheet on the panel when the lower arms of the clamping and support members support the rack whereby when pressure is applied on the upper side of the master sheet, the lips of each of the clamping and support members grip the master sheet, each of the lips extending substantially across the end of the panel to engage the master sheet throughout the width thereof.

4. A rack for holding an offset master sheet during treatment which comprises a flat, substantially rectangular panel adapted to support the master sheet, a pair of Z-shaped clamping and support members hinged on opposite ends of the rectangular panel, each of said clamping and support members including a lower arm extending away from the panel below the panel for supporting the panel, a central portion to which the hinge is attached, and an upper clamping arm adapted to overlie the end of the panel to which the clamping and support member is hinged, and a lip on the inner edge of the upper arm, the lower arm lying to that side of the hinge remote from the upper arm, the lips of said clamping and support members being adapted to engage and grip the ends of the master sheet and thereby hold the master sheet on the panel when the lower arms of the clamping and support members support the rack, whereby when pressure is applied on the upper side of the master sheet the lips of each of the clamping and support members grip the master sheet, each lip and each upper arm extending substantially across the end of the panel so that each lip engages the master sheet throughout the width thereof and the lip and the upper arm of each clamping and support member forms a cover over one of the ends of the master sheet to protect the ends of the master sheet.

5. A rack for holding an offset master sheet during treatment which comprises a flat, substantially rectangular panel adapted to support the master sheet, a pair of Z-shaped clamping and support members hinged on opposite ends of the rectangular panel, each of said clamping and support members including a lower arm extending away from the panel below the panel for supporting the panel, a central portion to which the hinge is attached, and an upper clamping arm adapted to overlie the end of the panel to which the clamping and support member is hinged, and a lip on the inner edge of the upper arm, the lower arm lying to that side of the hinge remote from the upper arm, the lips of said clamping and support members being adapted to engage and grip the ends of the master sheet and thereby hold the master sheet on the panel when the lower arms of the clamping and support members support the rack, whereby when pressure is applied on the upper side of the master sheet, the clamping and support members grip the master sheet, the clamping and support members being adapted to swing below the panel to a disengaged and panel supporting position in which the clamping and support members are adapted to support the panel with its upper surface exposed.

FRED H. DAVIS.

REFERENCES CITED

The following references are of record in the file of this patent:

UNITED STATES PATENTS

| Number | Name | Date |
|---|---|---|
| 965,887 | Flanigan | Aug. 2, 1910 |
| 2,103,617 | Gericke | Dec. 28, 1937 |